Oct. 26, 1965    J. F. A. MEYER ETAL    3,213,954
APPARATUS FOR WEIGHT SETTING WEIGHING DEVICES
Filed Jan. 15, 1963    10 Sheets-Sheet 1

Fig. 1.

INVENTORS
JOHN F. A. MEYER
NORMAN H. CALVERT

Learman, Learman, & McCulloch
ATTORNEYS

| | A | B | C | D | E | F | G | H | I |
|---|---|---|---|---|---|---|---|---|---|
| 1W | 0° OFF | 180° -ON- | 360° OFF | 540° -ON- | 720° OFF | 900° -ON- | 1080° OFF | 1260° -ON- | 1440° OFF |
| 2W | 0° OFF | 90° OFF | 180° -ON- | 270° -ON- | 360° OFF | 450° -ON- | 540° -ON- | 630° -ON- | 720° OFF |
| 4W | 0° OFF | 45° OFF | 90° OFF | 135° OFF | 180° -ON- | 225° -ON- | 270° -ON- | 315° -ON- | 360° OFF |
| 8W | 0° OFF | 22½° OFF | 45° OFF | 67½° OFF | 90° OFF | 112½° OFF | 135° OFF | 157½° OFF | 180° -ON- |
| 16W | 0° OFF | 11¼° OFF | 22½° OFF | 33¾° OFF | 45° OFF | 56¼° OFF | 67½° OFF | 78¾° OFF | 90° OFF |
| 32W | 0° OFF | 5⅝° OFF | 11¼° OFF | 16⅞° OFF | 22½° OFF | 28⅛° OFF | 33¾° OFF | 39⅜° OFF | 45° OFF |
| 64W | 0° OFF | 2¹³⁄₁₆° OFF | 5⅝° OFF | 8⁷⁄₁₆° OFF | 11¼° OFF | 14¹⁄₁₆° OFF | 16⅞° OFF | 19¹¹⁄₁₆° OFF | 22½° OFF |
| | 0 | 1W | 2W | 3W | 4W | 5W | 6W | 7W | 8W |

DEGREES OF ROTATION OF CAMS FROM ZERO POSITION

TOTAL WEIGHT ON BEAM

Fig. 12.

DEGREES OF ROTATION OF CAMS FROM ZERO POSITION

| | A | B | C | D | E | F | G | H | I | J | K | L | |
|---|---|---|---|---|---|---|---|---|---|---|---|---|---|
| 1W | 10,800° OFF | 10,980° -ON- | 11,160° OFF | 11,340° -ON- | 11,520° OFF | 11,700° -ON- | 11,880° OFF | 12,060° -ON- | 12,240° OFF | 12,420° -ON- | 12,600° OFF | 12,780° -ON- | |
| 2W | 5,400° OFF | 5,490° OFF | 5,580° -ON- | 5,670° -ON- | 5,760° OFF | 5,850° OFF | 5,940° -ON- | 6,030° -ON- | 6,120° OFF | 6,210° OFF | 6,300° -ON- | 6,390° -ON- | |
| 4W | 2,700° -ON- | 2,745° -ON- | 2,790° -ON- | 2,835° -ON- | 2,880° OFF | 2,925° OFF | 2,970° OFF | 3,015° OFF | 3,060° -ON- | 3,105° -ON- | 3,150° -ON- | 3,195° -ON- | |
| 8W | 1,350° -ON- | 1,372½° -ON- | 1,395° -ON- | 1,417½° -ON- | 1,440° OFF | 1,462½° OFF | 1,485° OFF | 1,507½° OFF | 1,530° -ON- | 1,552½° OFF | 1,575° OFF | 1,597½° OFF | |
| 16W | 675° -ON- | 686¼° -ON- | 697½° -ON- | 708¾° -ON- | 720° OFF | 731¼° OFF | 742½° OFF | 753¾° OFF | 765° OFF | 776¼° OFF | 787½° OFF | 798¾° OFF | |
| 32W | 337½° -ON- | 343⅜° -ON- | 348¾° -ON- | 359⅜° -ON- | 360° OFF | 365⅝° OFF | 371¼° OFF | 376⅞° OFF | 382½° OFF | 388⅛° OFF | 393¾° OFF | 399⅜° OFF | |
| 64W | 168¾° OFF | 171 9/16° OFF | 174 3/8° OFF | 177 3/16° OFF | 180° -ON- | 182 13/16° -ON- | 185 5/8° -ON- | 188 7/16° -ON- | 191¼° -ON- | 194 1/16° -ON- | 196 7/8° -ON- | 199 9/16° -ON- | |
| | 60W | 61W | 62W | 63W | 64W | 65W | 66W | 67W | 68W | 69W | 70W | 71W | |

TOTAL WEIGHT ON BEAM

INVENTORS
JOHN F. A. MEYER
NORMAN H. CALVERT

ATTORNEYS

United States Patent Office 3,213,954
Patented Oct. 26, 1965

3,213,954
APPARATUS FOR WEIGHT SETTING WEIGHING DEVICES
John F. A. Meyer, Hildenborough, Kent, and Norman H. Calvert, Peterborough, Northampton, England, assignors to Baker Perkins Incorporated, Saginaw, Mich.
Filed Jan. 15, 1963, Ser. No. 251,623
17 Claims. (Cl. 177—248)

This invention relates to apparatus for automatically or semi-automatically setting, or changing the setting of, the weight loading on the weigh beam of a weighing device and uses a system of individual weights differing preferably in a mathematical progression, such as a binary or decimal system, so that desired weight loadings may be compounded from the individual weights with possible incremental differences equal to the value of the smallest weight.

The apparatus, according to the present invention, may be applied to any suitable weighing apparatus, either continuous or batch, but has particular utility in connection with the weight setting of continuous weigh feeders.

The apparatus, according to the present invention, may be applied to any suitable weighing apparatus, either continuous or batch, but has particular utility in connection with the weight setting of continuous weigh feeders.

An object of the present invention is to provide apparatus as indicated above in which the actual loading or unloading of weights on the weigh beam, weigh beam extension or the like (and hereinafter referred to as the weigh beam) of the weighing apparatus is carried out mechanically, while permitting visual checking of the loading. The choice of setting may be made automatically, by a remote control device, e.g., by use of a punch card system, or by manual selection of switches.

It is a further object of the present invention to provide apparatus as indicated above in which warning means are incorporated which automatically check the actual loading on the weigh beam against the setting of the remote control device so that a faulty switch or relay can be detected and the weighing apparatus will not be operated at an incorrect loading setting.

The invention consists in apparatus for setting or varying the setting of the weight loading on the weigh beam of a weighing device, wherein different combinations of individual weights having different weight values may be deposited onto the weigh beam by cyclically depositing each of said individual weights onto, and removing same from the weigh beam with a cyclic periodicity which is inversely proportional to the weight value, said weight depositing and removing being effected by pivotal weight levers, one associated with each weight, each of which is caused to pivot between a weight depositing and a weight removing position, by lever pivoting means, operative at said periodicity, means being provided to continually operate the lever pivoting means until a desired combination of levers is in the weight depositing position.

The invention further consists in apparatus according to the preceding paragraph, wherein the individual weight values form a mathematical progression.

The invention still further consists in apparatus according to the two preceding paragraphs, which includes control means for automatically stopping the operation of the lever pivoting means when the combination of weight levers which are in a weight depositing position correspond with a combination preset by the control means, and for automatically initiating operation of the lever pivoting means if such combination of weight levers does not correspond with the preset combination of the control means.

The invention still further consists in apparatus according to the three preceding paragraphs, wherein the lever poivoting means comprise rotary weight cam means associated with each lever having drive means associated therewith.

The invention still further consists in apparatus as set forth in any of the three preceding paragraphs, wherein the operating surface of each weight cam means is of substantially similar form, and each weight cam means is rotated at a relative speed which is inversely proportional to the weight value of its associated weight.

The invention still further consists in apparatus according to the preceding paragraph, wherein the weight cam means are mounted on a common cam shaft, and are driven successively one from another at successfully diminishing speeds, by means of a gear train, including a series of compound gears on a layshaft, each adapted to be driven by a gear wheel associated with one of the weight cam means, and to drive another gear wheel associated with the next succeeding weight cam means.

In carrying the invention into effect, according to one mode by way of example, apparatus will be described for automatically setting the weight loading on the weigh beam or steelyard of a weighing device using a binary system of seven weights giving 128 different weight settings in increments of the smallest weight. It will be appreciated, however, that apparatus employing any number of weights may be used, a system of eight weights for example giving 256 different settings, while systems having less weights give a smaller number of settings, which vary by incremental differences equal to the smallest weight.

The invention will be described with reference to the accompanying drawings, in which.

The weigh beam or steelyard 1 of a weighing device has rigidly secured at right angles thereto, at a suitable point spaced from the fulcrum (not shown), a weight-carrying bar or beam 2 (hereinafter referred to as the weigh beam) on which any desired combination of the system of weights can be loaded. Parallel to, but spaced away from, the weigh beam is a shaft 3 on which are pivotally carried seven weight-manipulating levers 4 (hereinafter referred to as weight levers), the ends of which overhang the weight beam 2.

It should be noted that the apparatus comprises, in certain instances, groups of similar components, each of which is associated with a particular weight of the seven weight system. In such cases, these componets will be referred to collectively or generally by a particular reference numeral, whilst a specific component of the group will be referred to by the group reference suffixed by the value of the weight with which it is associated. Thus, for example, reference numeral 4 refers to all or any of the weight levers, whereas reference $4_{8W}$ refers to the lever which operates the 8W weight.

The end of each lever 4 is shaped to engage a weight 5 so as to be capable of lowering the weight on to the weigh beam 2 or lifting it therefrom. To this end each weight 5 is conveniently in the form of a weight bob having a bail 6 extending upwardly therefrom through which the weigh beam at all times passes and by which the weight can be suspended from the weigh beam, the bail 6 having a second bail or suspension loop 7 in a plane at right angles to the first bail 6, through which the end of the associated weight lever 4 at all times passes and by which the weight can be suspended when not carried by the weigh beam 2.

By the above described arrangement, when the weight-carrying ends of any of the weight levers 4 are raised by lifting the levers, the weigh beam is relieved of such weights and when the weight-carrying ends of any of the weight levers are lowered, the weigh beam 2 is loaded with such weights which then become temporarily disassociated from their levers.

Figure 1:
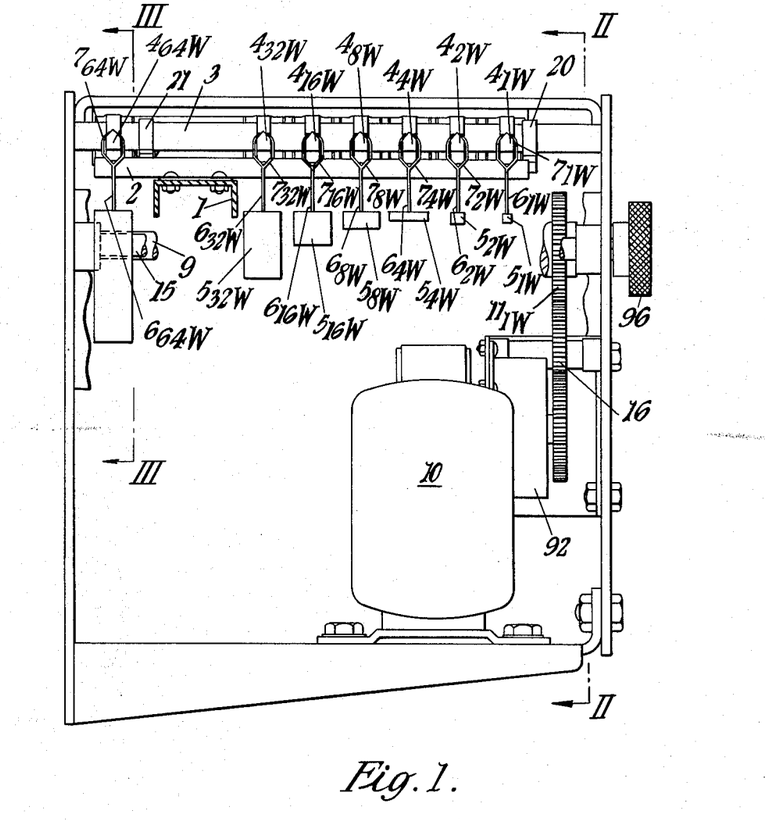
FIGURE 1 is a front elevation of weight loading apparatus according to the invention, details of the drive arrangement having, for the sake of clarity, been omitted.
Figure 2:
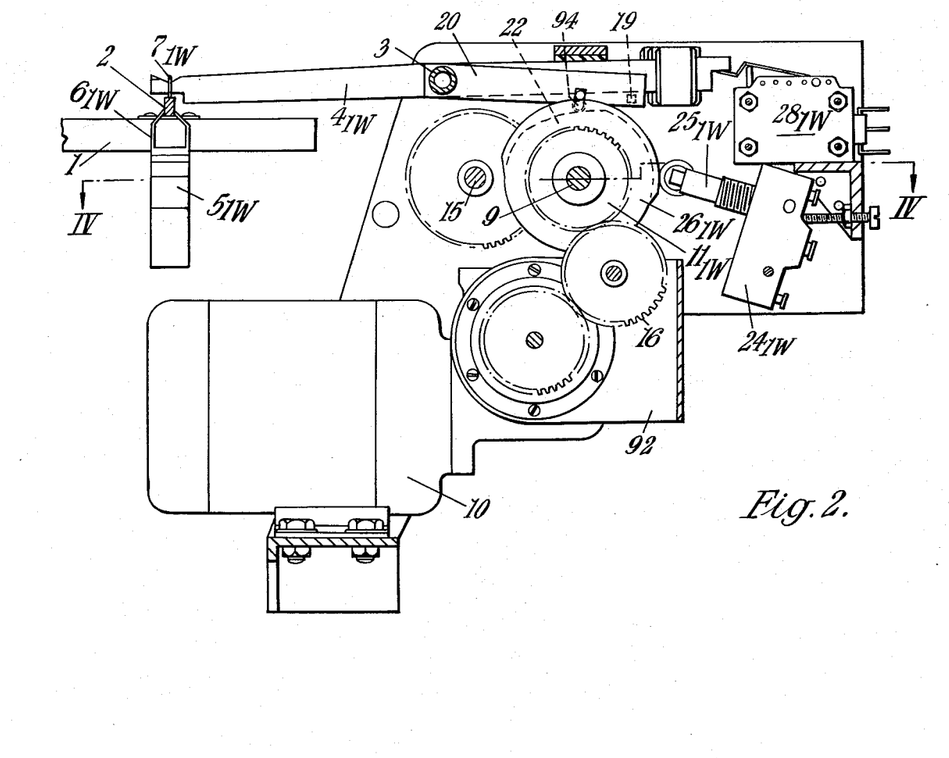
FIGURE 2 is a sectional side elevation of the apparatus viewed on line II—II of FIGURE 1 and showing the drive arrangement in more detail.
Figure 2A:
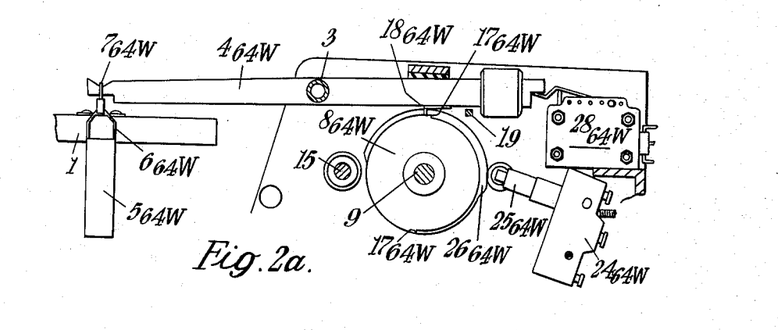
FIGURE 2a is a part sectional view of the apparatus viewed on line III—III of FIGURE 1.
Figure 3:
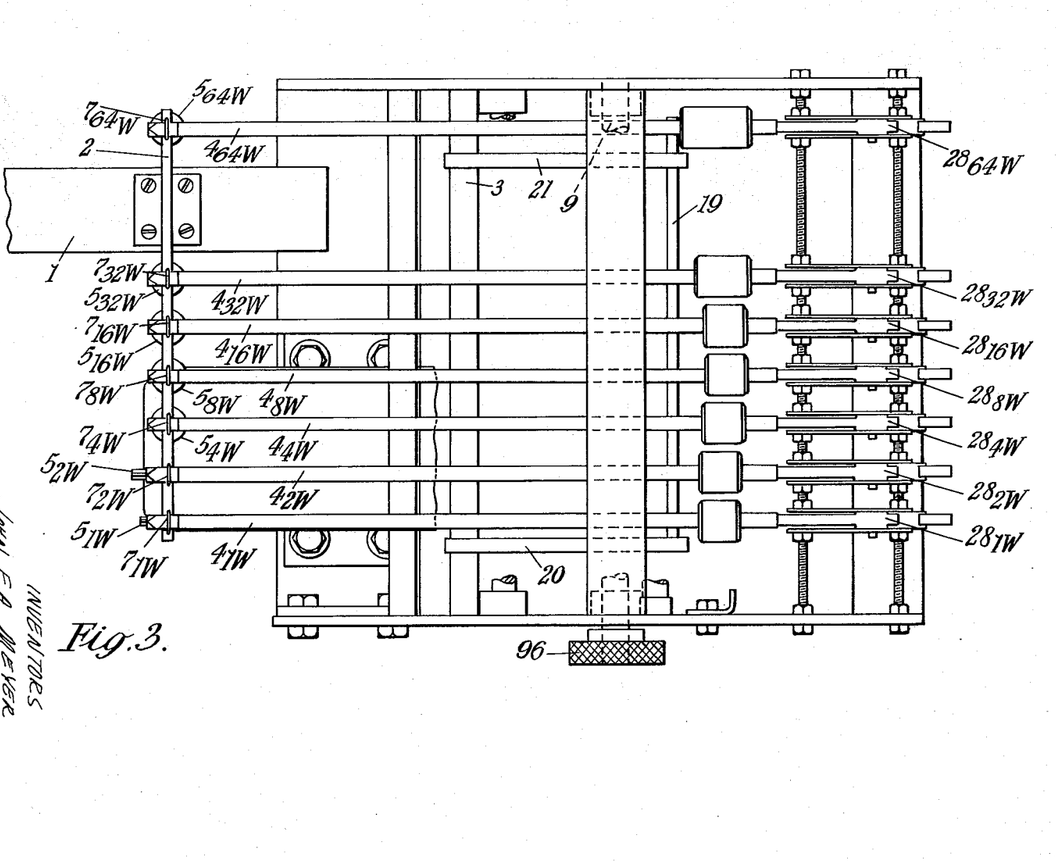
FIGURE 3 is a plan view of the apparatus, again for the sake of clarity omitting the details of the drive arrangement.
Figure 4:
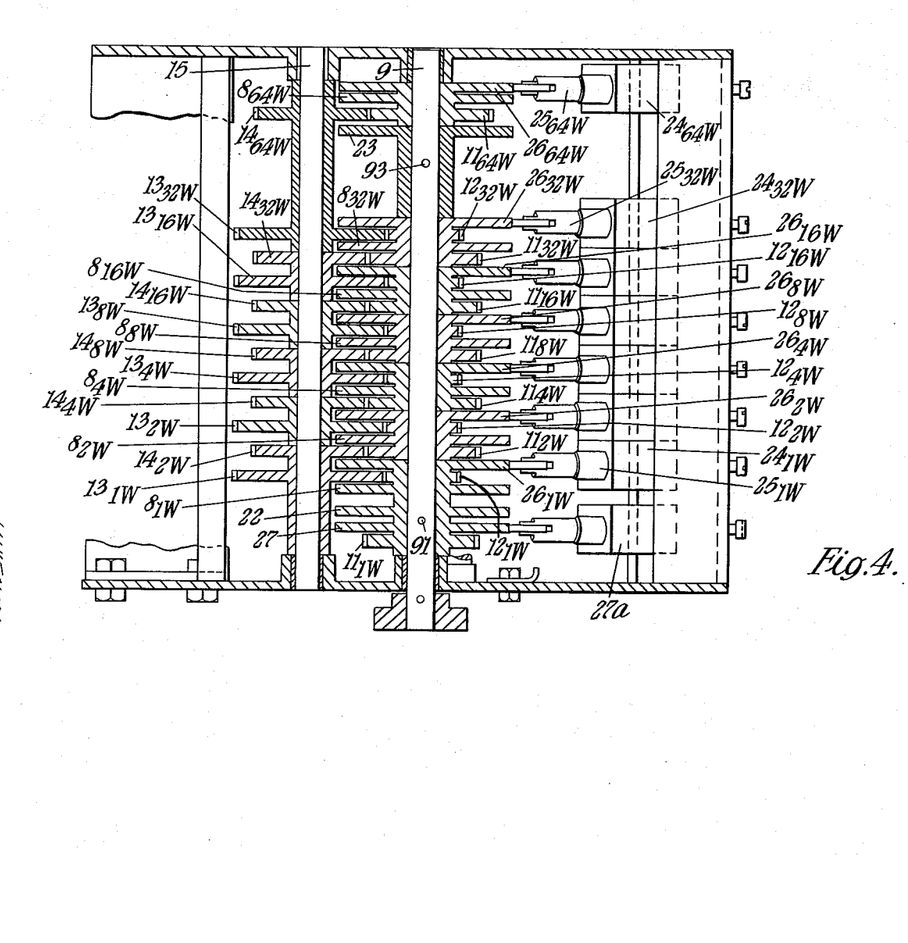
FIGURE 4 is a sectional plan showing the drive arrangement and viewed on the line IV—IV of FIGURE 2, FIGURES 5, 6, 7 and 8 are views of the various types of cams used in the drive arrangement.
Figure 5:
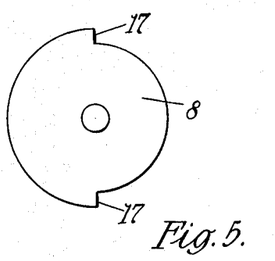

To effect raising and lowering of the weight levers 4 each lever has associated therewith lever pivoting means in the form of a rotary weight cam 8 and all the weight cams are mounted as will be described on a common cam shaft 9. Each weight cam as shown in FIGURE 5 has an operating surface portion of large diameter and an operating surface portion of smaller diameter which portions are joined by the steps 17 and by this arrangement during each complete rotation of the cam in contact with its associated lever, the latter is raised and lowered once.

As mentioned above, the weight system comprises seven weights, the weight values of which form a mathematical progression, thereby permitting a total number of different weight settings equal to the sum of the basic weight multiples with possible incremental differences equal to the value of the basic (smallest) weight, each setting depending on the number and value of weights resting on the weigh beam at the time. The weight series comprises weights 5 of value 1W, 2W, 4W, 8W, 16W, 32W and 64W, respectively, providing a total of 128 settings differing by W, and including a zero setting (no weights on the weigh beam).

In order to provide for the mechanised manipulation of these weights, i.e., loading and unloading the weigh beam to provide the required loadings, by raising or lowering of the associated weight levers 4, the rotary weight cams 8 associated with the levers are driven from a source of rotational power, e.g., an A.C. electric motor 10, so that the cams are rotated at different speeds corresponding to their associated weight proportions. This is achieved, by series driving the cams one from another through interposed reduction gearing. To this end, cam $8_{1W}$ is rigidly fixed to shaft 9 via pin $9_1$ whilst the other weight cams 8 are rotatably mounted on this shaft. Each cam 8 has a pair of rigidly attached gear wheels 11 and 12 for receiving and delivering the drive respectively and in order to effect this wheels 11 and 12 mesh with pairs of gear wheels 13 and 14 carried by shaft 15 as will be described. It should be noted that cam $8_{64W}$ has only a drive receiving gear wheel $11_{64W}$ associated therewith since this is the end of the drive train.

The drive passes from the motor 10 via an interposed D.C. operated magnetic clutch 92 and an idler gear 16 to gear wheel $11_{1W}$ attached to cam $8_{1W}$. Wheel $12_{1W}$ which is also attached to cam $8_{1W}$ thus rotates and drives wheel $13_{1W}$ on shaft 15. Gearwheel $13_{1W}$ is rigidly attached to wheel $14_{2W}$, which thus rotates and this wheel $14_{2W}$ meshes with wheel $11_{2W}$ attached to cam $8_{2W}$ thus transmitting the drive thereto and to wheel $12_{2W}$ which then transmits the drive to wheels $13_{2W}$ and $14_{4W}$. It will thus be appreciated that this series arrangement is continued down the line of cams, each wheel 11 of a particular cam 8 receiving the drive from a wheel 14 and each wheel 12 of a particular cam transmitting the drive to the reset wheel 13. Furthermore, the relative diameters of wheels 11, 12, 13 and 14 are such that each cam 8 is driven at half the speed of the preceding cam in the line and to this end the wheels 12 are half the diameter of the wheels 13, while wheels 14 and 11 are of equal diameter. (Alternatively wheels 14 could be half the diameter of wheels 11, with wheels 12 and 13 equal in diameter).

By the above arrangement, for a 360° rotation of cam $8_{1W}$, cam $8_{2W}$ will rotate through 180°, cam $8_{4W}$ through 90°, cam $8_{8W}$ through 45° and so on, the ratios of the speeds of the various cams 8 being 64:32:16:8:4:2:1 for the cams $8_{1W}:8_{2W}:8_{4W}:8_{8W}:8_{16W}:8_{32W}:8_{64W}$ respectively.

The D.C. operated magnetic clutch 92 engages when the weight cams are to be rotated and disengages when the required weights have been deposited on the weigh beam, and by this arrangement any overrun of the motor has no effect on the weight setting.

Figure 6:
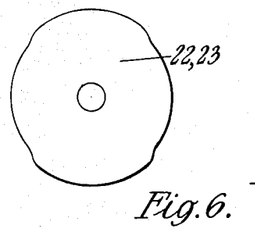

Due to the fact that for the heavier weights in the series the angular increment of rotation of the weight cams associated therewith become progressively smaller for each rotation of cam $8_{1W}$, the steps 17 in each of these cams between the lever-raise and -lower portions of the cam surface must be sharp and of small angular extent. (In practice it is convenient to use identical cams for each weight and these are shown in FIGURE 5.) It is also necessary for the same reason to provide a circumferentially narrow cam follower means on each lever, and to this end a narrow post or lug 18 projecting from each lever and engaging the associated cam surface is provided. It is therefore further necessary to provide means to lift momentarily the levers 4, as the cam followers 18 traverse the steps on the cams, independently of the cams 8. To effect this it is convenient to lift all the levers simultaneously by means of a rod or bar 19 (hereinafter referred to as the over-riding bar) passing under all the weight levers 4 and carried between a pair of over-riding levers 20 and 21 pivotally mounted on the weight lever shaft 3. The weight levers 4 are lifted by the over-riding bar 19 which is situated such that it is only effective to lift momentarily those levers which are not already in a raised position (i.e., have not traversed the step-up on their associated weight cams) and are therefore still supporting their weights clear of the weigh beam 2. The lever-lifting movements of the over-riding bar are provided by a pair of rotary cams 22 and 23 (hereinafter referred to as the over-riding cams and shown in FIGURE 6). Cam 23 is secured to the weight cam shaft 9 via pin 93 and cam 22 forms part of the cam $8_{1W}$ assembly. The over-riding cams engage, one each, with the over-riding levers 20 and 21 via followers 94. Thus, for each revolution of the cam shaft 9, and hence each rotation of the weight cam $8_{1W}$, the over-riding cams also make one revolution. The profile and relative phasing of the over-riding cams 22 and 23 with respect to the weight cams 8 is such as to lift the over-riding levers and bar 19 to raise the weight levers as the step 17 on each or any of the weight cams passes the cam follower of the associated weight lever.

It is further desirable, however, to provide for automatic setting of the weigh beam loading utilising the above described mechanism and to this end a suitable remote control device (shown in FIGURE 15 and described in more detail hereinafter) is provided which can be preset, or conditioned, to represent any desired weight loading made up of selected weights of the available weight system. When so preset, the device starts the motor 10 which rotates the cam shaft 9 and the gearing driving the various weight cams 8, so that the weight levers 4 are raised and lowered to load and unload the weigh beam. In order to stop the drive as soon as the selected loading has been achieved, as preset on the remote control device, detector means are associated with each weight cam so as to be actuated at the moment each weight lever is lowered and transfers its weight to the weigh beam, and, when only those detector means associated with the cams of the selected combination of weights are actuated, and no others, the conditions preset on the remote control device are matched and the motor drive to the cam shaft is immediately stopped.

Figure 7:
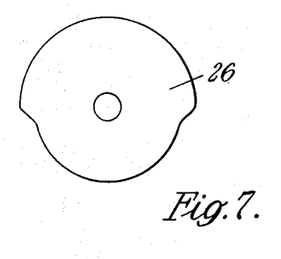

The detector means may comprise photo-electric cell means associated one with each weight cam and arranged so that the exciter light beams are interrupted by means rotating with the weight cams as each weight lever is lowered to transfer its weight to the weigh beam. In the preferred form however the detector means comprise an electric micro-switch 24 for each weight lever, the actuating arm 25 of which is disposed so as to be operated by a switch cam 26. Each switch cam 26 is rigidly attached to an associated weight cam 8 to rotate with it, and the profile of the switch cams (shown in FIGURE 7) and their angular phasing is such that the switch 24 which each switch cam controls is closed when the associated lever has transferred its weight to the weigh beam, and opened when the lever removes its weight from the weigh beam. As an expedient to speedy operation of the apparatus it may be desirable to provide for reversal of drive of the electric motor 10 driving the cam shaft 9, so that the motor rotates in one direction to increase the weight loading of the beam from a previous loading and in the opposite direction to decrease the weight loading. Thus, as is shown in FIGURE 15, the energisation of motor is effected through two relays, one for "forward" drive and the other for "reverse," the comparator of the remote control device controlling the energising of one or the other relay being such that a loading increase signalled to the remote control device causes it to energise the "forward" relay and a loading decrease signalled to the remote control device causes it to energise the "reverse" relay.

Since the switch cam $26_{1W}$ rotates twice as fast as the next switch cam $26_{2W}$, and four times as fast as the switch cam $26_{4W}$, and so on, the micro-switch $24_{1W}$ associated with cam $26_{1W}$ is always the last micro-switch to cause the motor drive to operate (if the switch pattern does not match up with the preset condition) or to cease operation (when the switch pattern does match up with the preset condition) and if the cam $26_{1W}$ operates switch $24_{1W}$ once every 180° of cam rotation, then a tolerance of ±90° is provided for motor over-run, manufacturing limitations and the like. Further since the micro-switch $24_{1W}$ will operate with other micro-switches 24 under certain loading settings, the cam setting of the cam $26_{1W}$ actuating the micro-switch $24_{1W}$ is given a slight lag so as to ensure that this micro-switch is the last one to be operated.

Figure 8:
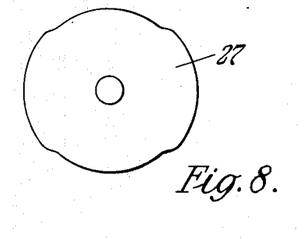

In order to provide for this lag in both directions of rotation of the cam shaft (i.e., such that there should not be an advance in the reverse cam shaft direction), an additional cam 27 (hereinafter referred to as the "hold-on" cam and shown in FIGURE 8) is provided and is rigidly attached to the assembly which includes cams $8_{1W}$ and $26_{1W}$ so as to rotate therewith and operate a separate switch 27a. This arrangement causes the motor to continue operating until cam 27 depresses switch 27a this being phased to occur only after the desired lag period is completed. The operation of the hold-on cam will be described hereafter.

Figure 15:
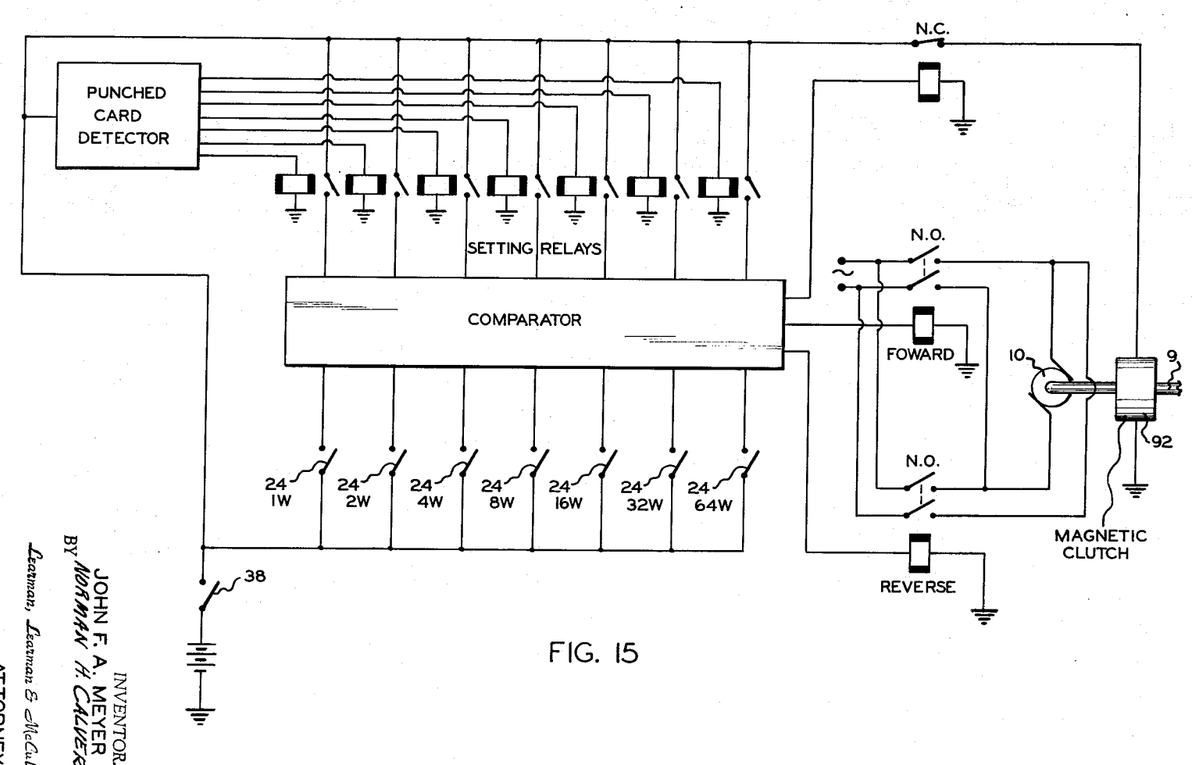
FIGURE 15 is a block diagram of the remote control device and showing its association with the rest of the weight setting apparatus.

The desired loading setting of the remote control device may be carried out manually with the use of manual switches, but it is preferred to use an automatic system, such as by the use of punched cards and the like which automatically select the required control functions for any weight setting, by presetting the setting relays of FIGURE 15 in accordance with a punch card's hole pattern, which must be matched by the relevant switches 24 to stop the motor and effect correct loading.

In the event of failure of any part of the electrical control circuit, however, the required setting is obtained by rotating the cam shaft 9 manually by means of hand knob 96 with the magnetic clutch 92 disengaged until the correct combination of weights can be seen to be on the weight beam.

In order to provide for a cross-check that the electrical part of the control circuit is operating correctly with the mechanical part of the apparatus, second detector means comprising a set of detector switches 28, one per weight, are provided and are actuated by the levers 4 when in their weight loading position whereby at the end of a weigh beam loading operation a visual or audio warning may be automatically given if these switches do not conform to their correct preset pattern for the chosen loading condition due to failure of the control circuitry on the cam, gear and lever mechanism.

As an alternative means for providing a cross check of the electrical control circuit, a potentiometer may be incorporated which is driven from the weight cams to rotate at substantially the speed of rotation of the slowest cam (i.e., cam $8_{64W}$). In this case the remote control device includes fixed resistances associated with each individual weight value of the available weight system and these resistances are automatically and selectively connected in series according to the combination of weights preset to make up the desired loading. The potentiometer is connected to the series of fixed resistances so as to form a bridge and if unbalance results on completing the loading operation (indicating a lack of matching between the weight combination preset in the remote control device and the weights actually loaded on to the weigh beam) a visual or audio warning device is actuated.

The warning means, such as a light or audible signal, is conveniently controlled by a normally energised relay such that the warning means is actuated when the relay is de-energised by the detector switches. When a weight setting operation is initiated, for example by insertion of a punched card in the punched card detector or reader shown in FIGURE 15, contacts 38 are closed which connect the circuitry to the electric supply and cause the necessary setting relays to close their associated switches to effect weight setting while at the same time the warning means relay is maintained and held energised through the setting circuit. The necessary cams are thus rotated and weight setting takes place. At the conclusion of the weight setting cycle, the setting switches which previously also served to maintain the circuit to the warning means relay open. If the weight setting operation has been fully and completely carried out by the mechanism, the setting of the correct weights on the weigh-beam causes associated switches to close which establish an alternative circuit to the warning means relay, so that the latter is maintained energised even when the original holding circuit opens, so that no warning occurs. If however the wrong weights are set on the weighing bar or the correct weights are not properly set, then these latter switches are not closed and no circuit is maintained to the warning means relay which becomes de-energised and the warning is given that an incorrect weight setting has been made.

The operation of the apparatus may be more readily understood by reference to FIGURES 9, 10, 11 and 12.

Figure 9:
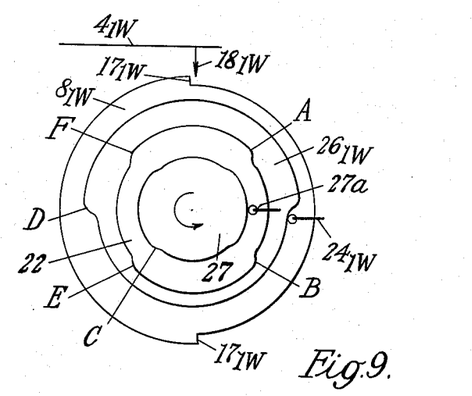
FIGURE 9 is a diagram showing the relative angular displacement of the various cams shown in FIGURES 5, 6, 7 and 8 on their shaft, in that position of the apparatus in which there is no load on the weigh beam.

Considering firstly FIGURE 9, this shows the relative angular positions of the cams associated with and rigidly fixed to weight cam $8_{1W}$, i.e., cams $26_{1W}$, 22 and 27. (Note, the cams as drawn are of different diameter. This is purely for clarity, and in practise, all the cams are of substantially the same size.) Consider cam $8_{1W}$ to be rotating as shown, then the follower $18_{1W}$ will have just traversed the upper step $17_{1W}$. Lever $4_{1W}$, however, will still be supported in its lifted position, until point A on the over-riding cam 22 is traversed. This causes the over-riding lever to fall with consequent fall of the lever $4_{1W}$ and thus the 1W weight is lifted off the weigh beam. Continuing the rotation this condition obtains and the follower $18_{1W}$ travels over the smaller diameter of cam $8_{1W}$ until point B of the over-riding cam is reached slightly in advance of the lower step $17_{1W}$. The action of this cam is then to lift lever $4_{1W}$ to traverse the lower step $17_{1W}$. Also before this step is reached, point C of the hold on cam 27 actuates switch 27a which operates the hold on circuit as will be described.

Immediately after traversal of lower step $17_{1W}$ by follower $18_{1W}$ micro switch $24_{1W}$ is actuated by portion D of the switch cam $26_{1W}$ the slight lag being for the reasons already described. The action of switch $24_{1W}$ may normally to be set up a matching condition between the detector switches 24 and the setting relays in the control device of FIGURE 15, causing the comparator to produce an output which will stop the motor. However the operation of the hold-on circuit is to inhibit this, and the motor continues to operate. When point E on the over-riding cam is reached, the levers 4 which are not lifted by their weight cams 8, are lowered and their corresponding weights are lifted from the weigh beam. Weigh 1W however is left on the beam, since follower $18_{1W}$ is now traversing the larger diameter of cam $8_{1W}$. On traversal of point F on the hold-on cam by switch 27a, the hold-on circuit is brought out of operation and if the matching condition described above does obtain, the motor is stopped with the 1W weight deposited on the weigh beam.

The above operational description relates to the loading of the 1W weight and it should be appreciated that loading of the other weights follows a similar procedure. Also, it will be appreciated that off-loading of the 1W weight follows a similar procedure to that above described and occurs exactly a half revolution (180°) of cam $8_{1W}$ after loading.

Figure 10:
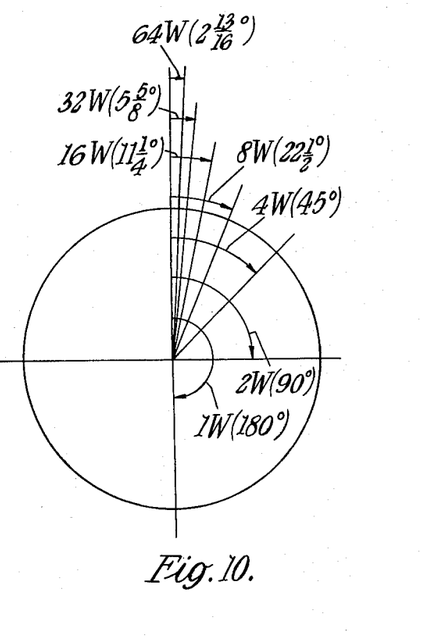
FIGURE 10 is a diagram showing the relative angular displacement increments of certain of the cams for a unitary displacement increment of one of them.
Figure 11:
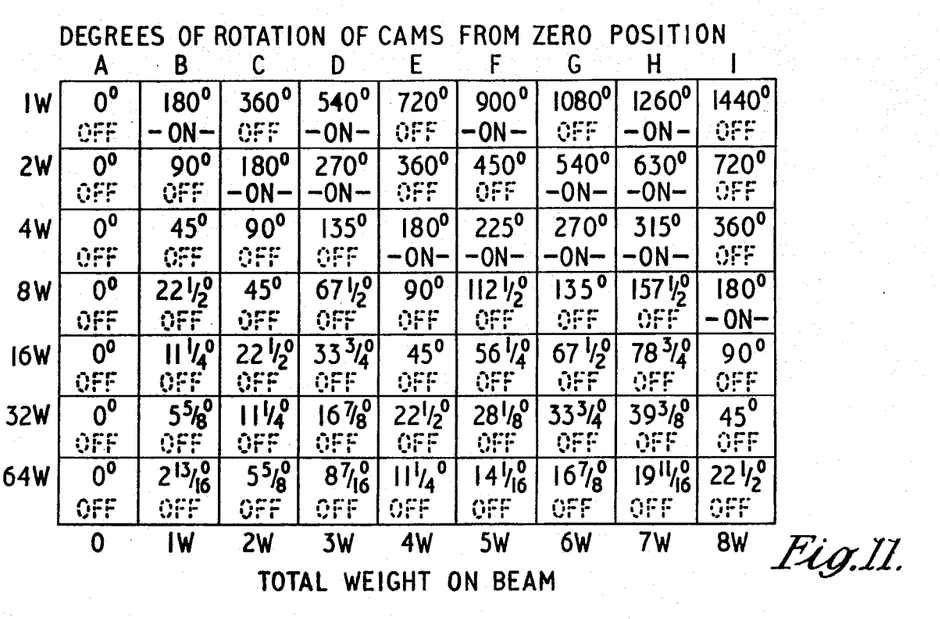
FIGURES 11 and 12 are tables illustrating the mode of operation of the apparatus by showing the weight loading patterns for various degrees of rotation of the drive.
Figure 12:
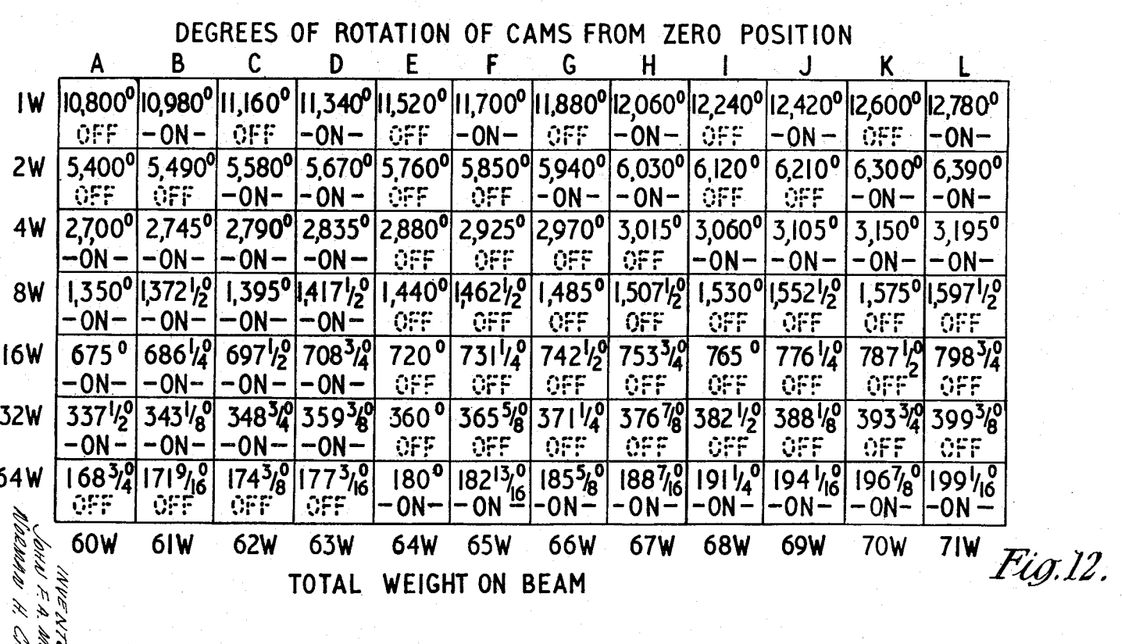

Referring now to FIGURES 10, 11 and 12, consider all the weight cams 8 to be at that position where all weights have just been taken off the weigh beam. This is referred to as the "zero position" and is the only position in which all the weight cams are substantially mutually in phase. This condition is illustrated in column A of FIGURE 11 (i.e., all weights off beam, all weight cams having no rotation from zero position). Now continuing the rotation of the weight cams, after the first 180° of rotation of the cam $8_{1W}$, its associated weight 1W is transferred to the weigh beam as described above, but due to the series drive of the weight cams, already described each rotates by a diminishing amount and no others will thus have yet achieved the 180° rotation from the zero position necessary for weight transference. This condition is shown in column B of FIGURE 11.

After a further 180° of rotation of cam $8_{1W}$ (column C, FIGURE 11) weight 1W is again removed from the beam, as described above, but the cam $8_{2W}$ has now achieved its first 180° rotation and thus the 2W weight is transferred onto the weigh beam. Successive columns of FIGURE 11, show successive half revolutions of the cam $8_{1W}$ and it can be seen that the effect of each 180° rotation (half revolution) of this cam is to increase the total weight on the beam by 1W.

A specific example of weight changing is shown in FIGURE 12 where it is desired to change an initial setting giving a total weight on beam 2 of 60W to a setting giving a total weight on the beam of 71W. The various weights on or off the beam for the initial condition and for each subsequent half revolution of cam $8_{1W}$ are shown in successive columns, eleven half-revolutions being necessary to complete the change of setting.

It will be appreciated that a complete cycle comprises 128 half revolutions of cam $8_{1W}$ and camshaft 9 and if it were desired to change from a setting of say 4W to say 3W in the forward direction 128 half revolutions of the camshaft would be necessary. It is for this reason that a reversing mechanism is employed as already mentioned.

Figure 13:
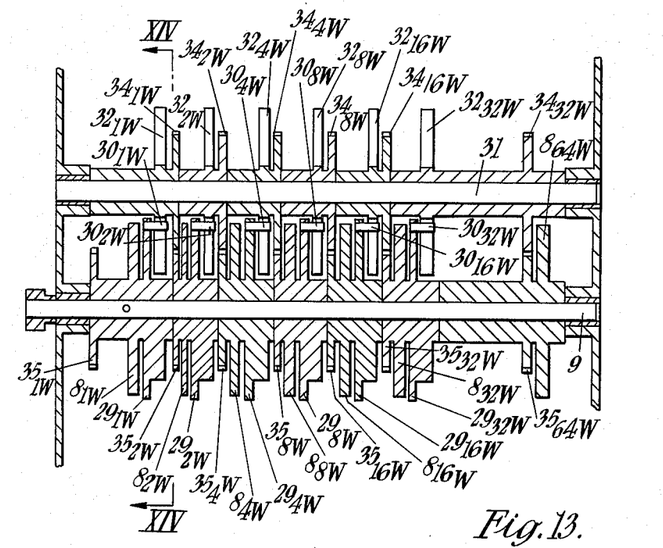
FIGURE 13 is a longitudinal sectional elevation of an alternative drive arrangement.
Figure 14:
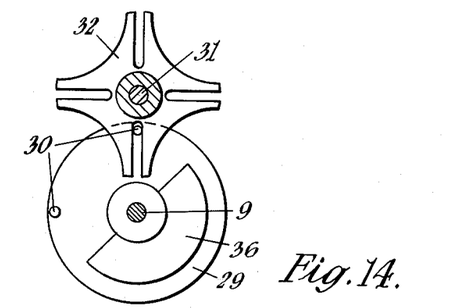
FIGURE 14 is a transverse section of this alternative arrangement, viewed on line XIV—XIV of FIGURE 13.

An alternative mode of driving the cams, a discontinuous drive, as between cam and cam, is shown in FIGURES 13 and 14 and comprises a Geneva motion-type drive means between each cam and the next, in place of the previously described gearing. To this end, between each weight cam and the next, there is provided, fixedly coupled to the cam 8, a pin wheel 29 with two pins 30 set 90° apart and co-operating therewith on a parallel layshaft 31 are star wheels 32 each with four equally spaced radial slots 33 adapted to successively engage and disengage with the pins 30 as the pinwheels 29 rotate. It can be seen that this engagement and subsequent sliding of a pin in a slot causes the star wheel to rotate for the time that a pin is in contact with the slot, and by having two pins spaced at 90° as shown, each star wheel is caused to rotate 180° for a 360° rotation of its associated pin wheel. Fixedly coupled to each star wheel 32 is a gearwheel 34 which engages in 1:1 ratio with a gearwheel 35 fixedly coupled to the next succeeding cam 8 (and pin wheel 29). Thus for each rotation of the cam $8_{1W}$ which is again rigidly fixed to shaft 9, and rotated via gearwheel $35_{1W}$ from the motor, the next cam $8_{2W}$, which is rotatably mounted on shaft 9, rotates for half the revolution then remains stationary for the next half revolution of cam $8_{1W}$ so that cam $8_{2W}$ rotates 1 revolution for every 2 revolutions of cam $8_{1W}$. This drive continues down the series of cam means through the pin wheel and star wheel and gearing drives, so that cam $8_{4W}$ makes 1 revolution for every 4 revolutions of cam $8_{1W}$ and so on until, say, the cam $8_{64W}$ makes one revolution for 64 revolutions of cam $8_{1W}$ means.

During the stationary dwell periods of the star wheels, during the times that the pins are not in engagement with the slots, each star wheel is locked in position in known manner by a 180° locking segment 36 provided on the pin wheel equidistant from the two pins.

It will be understood that by this arrangement, each weight cam 8, when it moves, moves through 180° and therefore gradual lift cam surfaces can be used instead of the sharp steps 17 previously described and so no over-riding device need be used. Further, for each weight, the weight cam 8 may also be used to operate the micro-switch 24, or this micro-switch may be operated by the lever itself, and for these reasons, no switch cams 26 or over-riding cams 22 and 23 need be provided. Since each cam comes to rest in either of two positions 180° apart, there is provided a ±90° tolerance (less the angular extent used for the cam lift) available on each cam for over-run etc. and therefore any number of weights can be accommodated.

Apart from the substitution of drive for the cams and consequent alternatives, such as the omission of over-riding mechanism the apparatus is made up and functions identically to that already described.

The principle of operation of the invention as described is the cyclic loading and off-loading of weights from the weigh beam, the cyclic periodicity for each weight of the series varying in inverse proportion to its weight value. This varying periodicity is accomplished, as described above, by rotating the weight cams at varying speeds, each weight cam having an identical number of lift and fall portions per rotation (viz. lift and fall portion as described above). It will be appreciated however that the number of these portions may be increased for all cams and further that it is entirely within the scope of the invention to vary the number of lift and fall portions per cam, in inverse proportion to the associated weight value and to rotate all the cams at the same speed. By this arrangement identical periodicity variation is obtained. Thus cam $8_{1W}$ would have sixty-four lift and fall portions, cam $8_{2W}$ would have 32, cam $8_{4W}$ would have 16 and so on down to cam $8_{64W}$ which would have only one lift and fall portion.

Furthermore it is equally within the scope of the invention to employ lever pivoting means other than weight cam means, for example eccentric or crank drives or the like adapted to operate at the required periodicity.

It is also appreciated, that although it is preferred to use a weight series in which the weights vary in value according to a mathematical progression, the apparatus would work equally well, if the values did not form a mathematical progression. For example, if say one weight of the above described series were missing, or if purely arbitrary and different values were chosen for each weight, different combinations of weights could still be loaded onto the bar, provided that the cyclic periodicity of the weight cam or other lever pivoting means associated with each weight is still suitably chosen.

We claim:

1. Apparatus for setting and changing the setting of the weight loading on the weigh beam of a weighing device, whereby different combinations of individual weights having different weight values may be successively deposited onto the weigh beam, comprising a plurality of weight transferring levers, a weight supporting portion formed on each of said levers to align with the weigh beam, pivotal mounting means for each of said levers, a pluarilty of weights of different values for association each with a lever, means associated wtih each weight for removably suspending same from the weight supporting portion of its associated lever, means for pivoting each lever, with a periodicity inversely proportional to the value of its associated weight between a weight removing position in which the associated weight is suspended therefrom by said suspending means and a weight depositing position in which support of said weight is entirely transferred to the weigh beam, means for automatically initiating the operation of said lever pivoting means, means for detecting the successively different combinations of levers pivoted to the weight depositing position, and means reponsive to said detecting means for automatically terminating said operation when a desired combination of levers is detected in the weight depositing position.

2. The apparatus claimed in claim 1 in which the values of the individual weights form a mathematical progression.

3. Apparatus for setting and changing the setting of the weight loading on the weigh beam of a weighing device, whereby different combinations of individual weights having different weight values may be successively deposited onto the weigh beam, comprising a plurality of weight transferring levers, a weight supporting portion formed on each of said levers to align with the weigh beam, pivotal mounting means for each of said levers, a plurality of weights of different values for association each with a lever, means associated with each weight for removably suspending same from the weight supporting portion of its associated lever, means for pivoting each lever, with a periodicity inversely proportional to the value of its associated weight, between a weight removing position in which the associated weight is suspended therefrom by said suspending means and a weight depositing position in which support of said weight is entirely transferred to the weight beam, and control means for controlling said lever pivoting means, said control means including means for presetting a desired weight combination, means for comparing said preset weight combination with the combination of levers in weight depositing positions, means for initiating operation of the lever pivoting means if said combination of levers in weight depositing positions does not correspond with said preset weight combination, and means for terminating operation of the lever pivoting means when said combination of levers does correspond with said preset weight combination.

4. The apparatus claimed in claim 1, in which said lever pivoting means comprise rotary weight cam surface means associated with each lever.

5. Apparatus for setting and changing the setting of the weight loading on the weigh beam of a weighing device, whereby different combinations of individual weights having different weight values may be successively deposited onto the weigh beam, comprising a plurality of weight transferring levers, a weight supporting portion formed on each of said levers to align with the weigh beam, pivotal mounting means for each of said levers, a plurality of weights of different values for association each with a lever, means associated with each weight for removably suspending same from the weight supporting portion of its asociated lever, means for pivoting each lever, with a periodicity inversely proportional to the value of its associated weight, between a weight removing position in which the associated weight is suspended therefrom by said suspending means and a weight depositing position in which support of said weight is entirely transferred to the weigh beam, said lever pivoting means comprising rotary weight cam surface means associated with each lever, all of said cam surface means being of identical form, means for initiating the operation of said lever pivoting means, and means for terminating said operation when a desired combination of levers is in the weight depositing position.

6. An apparatus as claimed in claim 5, and further including gear train means associated with all of said weight cam surface means for rotating same successively, one from another in series over successively diminishing angular displacements, and rotational input shaft means for said gear train mean.

7. An apparatus as claimed in claim 6, in which said gear train means comprise a drive receiving gear associated with each of said weight cam means, a drive transmitting gear associated with each of said weight cam means, a plurality of first idler gears each associated in mesh with one of said drive transmitting gears, and a plurality of second idler gears, each rigidly attached to one first idler gear, and associated in mesh with the drive receiving gear of that weight cam means which succeeds in series the weight cam means associated with said first idler gear, the ratio between each drive receiving gear and each drive transmitting gear through the intervening idler gears providing said successively diminishing angular displacements.

8. The apparatus claimed in claim 4, in which each of said rotary weight cam surface means comprises a portion of relatively large radius, a portion of relatively small radius, and a pair of oppositely disposed steps connecting said portions.

9. An apparatus as claimed in claim 8, which further includes overriding means for lifting the weight levers to clear said steps in response to any of said rotary weight cam surface means attaining a predetermined angular displacement with respect to the associated lever.

10. The apparatus as claimed in claim 9 in which said overriding means comprise an overriding bar commonly engaging all the weight levers, a pair of pivotal overriding levers mounting said overriding bar, rotary overriding cam surface means associated with said overriding levers, and means for rotating said overriding cam surface means in timed relation to the rotation of the weight cam surface means.

11. The apparatus claimed in claim 1 in which the lever pivoting means comprise rotary weight cam surface means associated with each lever, and means for rotating the cam surface means succesively one from the other, stepwise over successively diminishing angular displacements.

12. The apparatus claimed in claim 11 in which the means for rotating the cam surface means stepwise comprise a Geneva motion linkage between successive cam surface means.

13. Apparatus for setting and changing the setting of the weight loading on the weigh beam of a weighing device, whereby different combinations of individual weights of a weight series having different weight values may be deposited onto the weigh beam, comprising a plurality of weight transferring levers, a weight supporting portion on each of said levers to align with the weigh beam, pivotal mounting means for each of said levers, a plurality of weights of different values for association each with a lever, means associated with each weight for removably suspending same fom the weight supporting portion of its associated lever, rotary weight cam surface means associated with each lever for pivoting same, with a periodicity inversely proportional to the value of its associated weight, between a weight removing position in which the associated weight is suspended therefrom by said suspending means and a weight depositing position in which support of said weight is entirely tranferred to the weigh beam, means for rotating said weight cam means, and control means for said rotating means comprising a plurality of presettable switch means, one per weight, for presetting a desired loading combination, a plurality of detector means associated one with each lever and actuated in response to the associated levers attaining a weight depositing position to form a combination of actuated detector means which corresponds with the combination of weights deposited onto the weigh beam, means for comparing said preset loading combination with said combination of actuated detector means, means for initiating rotation of the weight cam means if said actuated detector means combination does not correspond with said preset combination, and means for terminating said rotation when said combinations do correspond.

14. The apparatus claimed in claim 13 in which said detector means comprise microswitches.

15. Apparatus for setting and changing the setting of the weight loading on the weigh beam of a weighing device, whereby different combination of individual weights of a weight series having different weight values may be deposited onto the weigh beam, comprising a plurality of weight transferring levers, a weight supporting portion on each of said levers to align with the weigh beam, pivotal mounting means for each of said levers, a plurality of weights of different values for association each with a lever, means associated with each weight for removably suspending same from the weight supporting portion of its associated lever, rotary weight cam surface means associated with each lever for pivoting same, with a periodicity inversely proportional to the value of its associated weight, between a weight removing position in which the associated weight is suspended therefrom by said suspending means and a weight depositing position in which support of said weight is entirely transferred to the weigh beam, means for rotating said weight cam means, and control means for said rotating means comprising a plurality of presettable switch means, one per weight, for presetting a desired loading combination, a plurality of microswitches associated one with each lever, a plurality of switch cam means associated one with each weight cam surface means for actuating said microswitches in response to the associated levers attaining a weight depositing position to form a combination of actuated microswitches which corresponds with the combination of weights deposited onto the weigh beam, means for comparing said present loading combination with said combination of actuated microswitches, means for initiating rotation of the weight cam means if said actuated microswitch combination does not correspond with said preset combination, and means for terminating said rotation when said combination do correspond.

16. Apparatus for setting and changing the setting of the weight loading on the weigh beam of a weighing device, whereby different combinations of individual weights of a weight series having different weight values may be deposited onto the weigh beam, comprising a plurality of weight transferring levers, a weight supporting portion on each of said levers to align with the weigh beam, pivotal mounting means for each of said levers, a plurality of weights of different values for association each with a lever, means associated with each weight for removably suspending same from the weight supporting portion of its associated lever, rotary weight cam surface means associated with each lever for pivoting same, with a periodicity inversely proportional to the value of its associated weight, between a weight removing position in which the associated weight is suspended therefrom by said suspending means and a weight depositing position in which support of said weight is entirely transferred to the weigh beam, means for rotating said weight cam means, and control means for said rotating means comprising a plurality of presettable switch means, one for each weight, automatic signal input means for actuating said presettable switch means to form a combination of preset switch means which corresponds to a desired weight loading combination, a plurality of microswitches associated one with each lever, a plurality of switch cam means associated one with each weight cam surface means for actuating said microswitches in response to the associated levers attaining a weight depositing position to form a combination of actuated microswitches which corresponds with the combination of weights deposited onto the weigh beam, means for comparing said combination of preset switch means with said combination of actuated microswitches, means for initiating rotation of the weight cam means if said actuated microswitch combination does not correspond with said combination of preset switch means, and means for terminating said rotation when said combination do correspond.

17. The apparatus claimed in claim 16 in which said automatic signal input means comprise punched card means.

References Cited by the Examiner

UNITED STATES PATENTS

| | | | |
|---|---|---|---|
| 1,082,967 | 12/13 | Moore | 177—237 X |
| 1,444,505 | 2/23 | Hathaway | 235—136 X |
| 1,618,140 | 2/27 | Seward | 235—136 X |
| 1,624,588 | 4/27 | Essmann | 177—248 |
| 1,944,071 | 1/34 | Essmann | 177—237 |
| 2,066,762 | 1/37 | Bryce | 177—237 X |
| 2,344,627 | 3/44 | Mixer | 235—136 |
| 2,360,615 | 10/44 | Mixer | 235—136 X |
| 2,459,107 | 1/49 | Johnson | 235—139.1 |
| 3,004,617 | 10/61 | Burdick et al. | 177—70 X |
| 3,015,439 | 1/62 | Gang | 235—135 X |
| 3,047,083 | 7/62 | Chyo | 177—191 X |
| 3,056,549 | 10/62 | De Young | 235—139 X |
| 3,104,806 | 9/63 | Allen | 177—25 |

FOREIGN PATENTS 481,995  6/53  Italy.

LEO SMILOW, *Primary Examiner.*